United States Patent
Rotta et al.

(10) Patent No.: US 11,093,882 B2
(45) Date of Patent: Aug. 17, 2021

(54) SYSTEM AND METHOD FOR A COGNITIVE IT CHANGE REQUEST EVALUATOR

(71) Applicant: International Business Machines Corporation, Armonk, NY (US)

(72) Inventors: Thiago Cesar Rotta, Campinas (BR); Antonio Manuel Sant Ana Monteiro Torres, Rio de Janeiro (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 15/823,968

(22) Filed: Nov. 28, 2017

(65) Prior Publication Data
US 2019/0164100 A1 May 30, 2019

(51) Int. Cl.
*G06Q 10/06* (2012.01)
*G06N 20/00* (2019.01)
*G06F 16/23* (2019.01)

(52) U.S. Cl.
CPC ... *G06Q 10/06375* (2013.01); *G06F 16/2358* (2019.01); *G06N 20/00* (2019.01); *G06Q 10/067* (2013.01)

(58) Field of Classification Search
None
See application file for complete search history.

(56) References Cited

U.S. PATENT DOCUMENTS

| | | | |
|---|---|---|---|
| 7,103,871 B1 | 9/2006 | Kirkpatrick et al. | |
| 7,783,973 B2 | 8/2010 | Banavar et al. | |
| 7,822,724 B2 | 10/2010 | DiFalco et al. | |
| 7,853,675 B2 | 12/2010 | Cannon et al. | |
| 8,607,190 B2 | 12/2013 | Coldicott et al. | |
| 8,782,201 B2 | 7/2014 | Kephart et al. | |

(Continued)

OTHER PUBLICATIONS

S. N. Ahsan, J. Ferzund and F. Wotawa, "Automatic Classification of Software Change Request Using Multi-label Machine Learning Methods," 2009 33rd Annual IEEE Software Engineering Workshop, 2009, pp. 79-86, (Year: 2009).*

(Continued)

*Primary Examiner* — Arif Ullah
(74) *Attorney, Agent, or Firm* — Nicholas A. Welling; Aaron N. Pontikos

(57) ABSTRACT

The present invention is a system and method for evaluating an IT change request system based on cognitive and machine learning technologies. The system includes a computing device having a change request evaluator based on a machine learning trained model and in digital communication with a server. A historical database stores change records and a definitions database stores a definition for words appearing in the change records. A change request is received at the change request evaluator, which finds a model change record by comparing the change request to the change records in the historical database and identifying definitions common to both the change request and the change record. A business mapping tool interfaces with the change request evaluator and determines a business impact of the model change record and associates the business impact with the change request. The change request evaluator approves or rejects the change request.

18 Claims, 4 Drawing Sheets

(56) References Cited

U.S. PATENT DOCUMENTS

| | | |
|---|---|---|
| 9,202,188 B2 | 12/2015 | Chen et al. |
| 9,680,707 B2 | 6/2017 | Torrence et al. |
| 2005/0198639 A1* | 9/2005 | Matsui .................. G06Q 10/06 718/100 |
| 2007/0100892 A1* | 5/2007 | Kephart ................. G06Q 10/06 |
| 2007/0150342 A1* | 6/2007 | Law ................... G06Q 30/0254 705/14.52 |
| 2008/0215713 A1* | 9/2008 | Cannon ............... H04L 41/0866 709/221 |
| 2009/0006143 A1* | 1/2009 | Orttung .................. G06F 40/56 705/5 |
| 2012/0023076 A1 | 1/2012 | Torrence |
| 2015/0067635 A1 | 3/2015 | Chen |
| 2016/0357620 A1 | 12/2016 | Beasley |
| 2017/0048102 A1 | 2/2017 | Thomas |
| 2017/0147961 A1* | 5/2017 | Haas ............. G06Q 10/063118 |

OTHER PUBLICATIONS

Kadar, Cristina, et al.; Automatic Classification of Change Requests for Improved IT Service Quality; 2011 Annual SRII Global Conference; copyright 2011 IEEE; pp. 430-439.

\* cited by examiner

SYSTEM AND METHOD FOR A COGNITIVE IT CHANGE REQUEST EVALUATOR

BACKGROUND

The present invention relates generally to approval of change requests in an information technology (IT) environment, and more particularly to a system and method for an IT change request system based on cognitive and machine learning technologies. In the IT environment, there are often situations that call for an adjustment of a system or product. Adjustments to the system or product are executed using a formal process which promotes changes in the infrastructure and applications of the system or product based on needs. Such needs may be related to business, security, or performance, for example. Needs may also be specific to each customer. The general software application and product may need to be changed at installation to better suit the customer's business, while additional changes may be required as the customer's business expands its capabilities and adapts, or as updates become available. While changes can vary from simple changes to complex changes touching many areas of IT, the goal of the formal change process is to minimize disruption to the system (or product) and reduce the utilization of resources involved in executing the change.

For traditional change approval systems, as in the example shown in FIG. 1, approval of one or more stakeholders is required. In such changes, there is an approval process, which may involve several approvers (i.e., stakeholders), each with a different role. In one example, each approver receives the change request and must either approve or reject it. If there are multiple approvers, each approver must take time and expend work effort to understand the impact of the change, evaluate the time of the change, check for complexities and dependencies of the change, and determine the business impact of the change, for example. In another example, two different types of change requests may require two different subsets of approvers. Therefore, numerous change requests involving many different subsets of approvers requires extensive coordination, which reduces the efficiency of the change approval process.

In addition to the time and effort of the approvers, the change owner must oversee the approval process. The change owner may be required to expend time and effort generating a list of approvers and obtaining approvals from the listed approvers in addition to evaluating the impact, complexity, date, and time of the change. Therefore, current change approval processes, as shown in FIG. 1 for example, are complex, time-consuming, and consequently, inefficient. Inefficiency in the change approval process leads to significant delays in executing upgrades or changes ordered by the customer. Such delays result in wasted productivity for the customer and ultimately, low customer satisfaction.

Therefore, there is a need for a system and method to significantly reduce the time and effort expended in the change approval process.

SUMMARY

The present invention is a cognitive system and method for evaluating an IT change request. In one embodiment, the system includes, but is not limited to, a computing device having a change request evaluator based on a machine learning trained model in digital communication with one or more servers, a historical database in digital communication with the change request evaluator and including one or more change records, and a definitions database in digital communication with the change request evaluator and including a definition for one or more words in the change records. A change request is received at the change request evaluator. The change request evaluator finds a model change record by comparing the change request to the one more change records in the historical database and identifying definitions common to both the change request and the one or more change records. In one embodiment, the historical database leverages a set of predefined change recipes from the one or more change records. In another embodiment, a contractual evaluation is performed to ensure the change request does not breach any SLA or change freeze period. A business mapping tool is adapted to interface with the change request evaluator. The business mapping tool determines a business impact of the model change record and associates the business impact with the change request. The change request evaluator approves the change request at the one or more servers by leveraging the machine learning trained model, change policies, and complexity, and if the business impact of the change request is below a threshold.

In another embodiment, a method for evaluating an IT change request includes, but is not limited to, the steps of: (i) receiving a change request at a change request evaluator of a computing device, the change request evaluator based on a machine learning trained model; (ii) generating a change record, via the change request evaluator, in a change record database, which is in digital communication with change request evaluator; wherein the change record includes change data having a change period with a proposed execution date and time; (iii) determining whether the change request can be executed at the proposed execution date and time by identifying dependencies between the change request and prior change records stored in a historical database, which is in digital communication with change request evaluator; (iv) determining whether the change request meets contractual criteria stored in a change exceptions database, which is in digital communication with change request evaluator; (v) identifying a business impact of the change request; and (vi) approving the change request based at least in part on the dependencies, business impact, and contractual criteria.

In an alternative embodiment, a computer program product for evaluating an IT change request with a machine learning trained model includes, but is not limited to, a computer readable storage medium having program instructions embodied therewith, wherein the computer readable storage medium is not a transitory signal per se. The program instructions are readable by a computer to cause the computer to perform a method including, but not limited to, the steps of: (i) receiving a change request; (ii) generating a change record having data representing a change period with a proposed execution date and time, and a targeted system; (iii) determining whether the change request can be executed on the proposed execution date and time and at the targeted system by identifying dependencies between the change request and prior change records stored in a historical database; (iv) determining whether the change request meets contractual criteria stored in a change exceptions database; (v) identifying a business impact of the change request; and (vi) approving the change request based at least in part on the dependencies, business impact, and contractual criteria. Additional steps may include generating a change approval policy and a change recipe based at least in part on the data from the change record and the success criteria.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
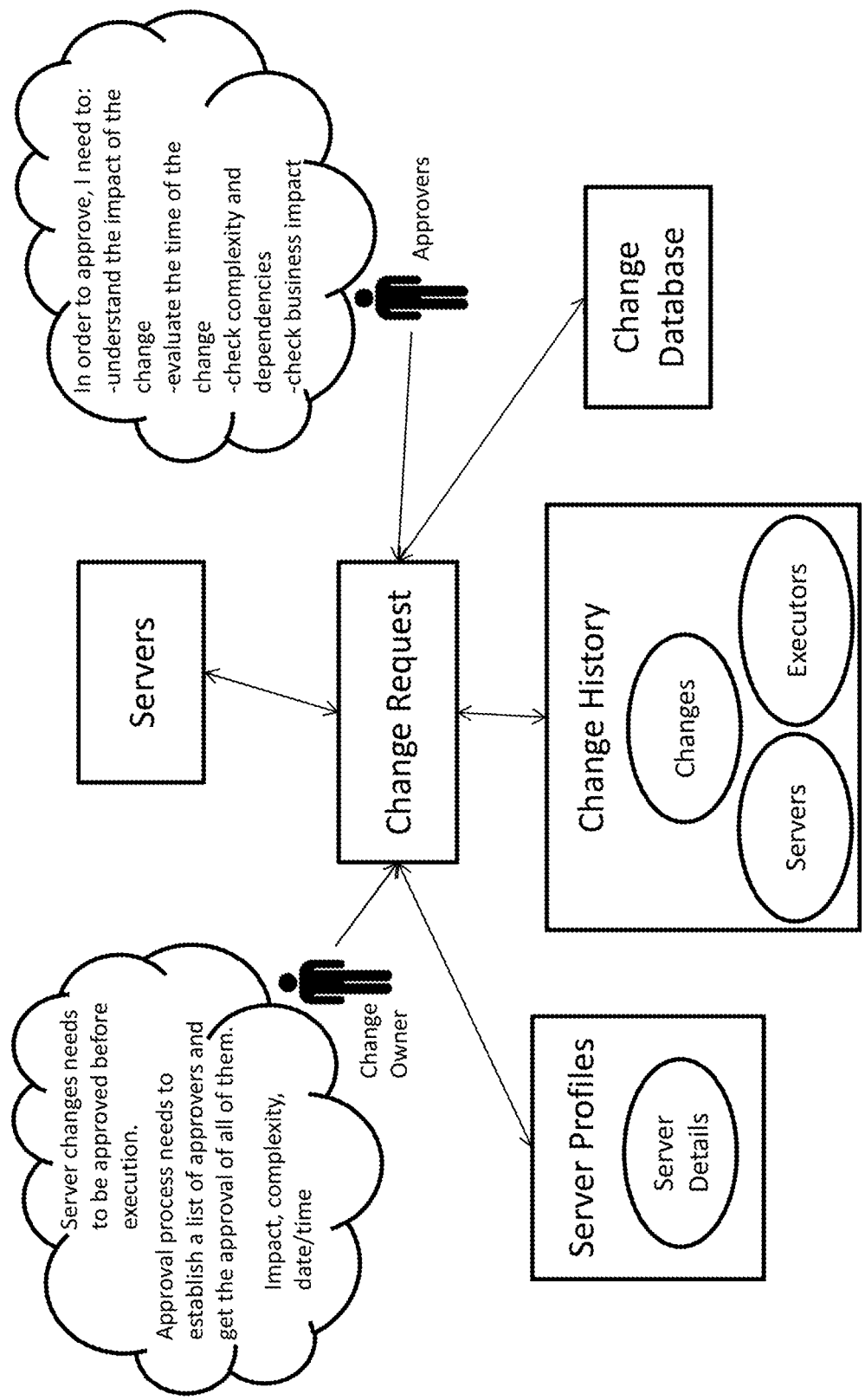
FIG. 1 is a diagram of a traditional change approval process according to the prior art.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
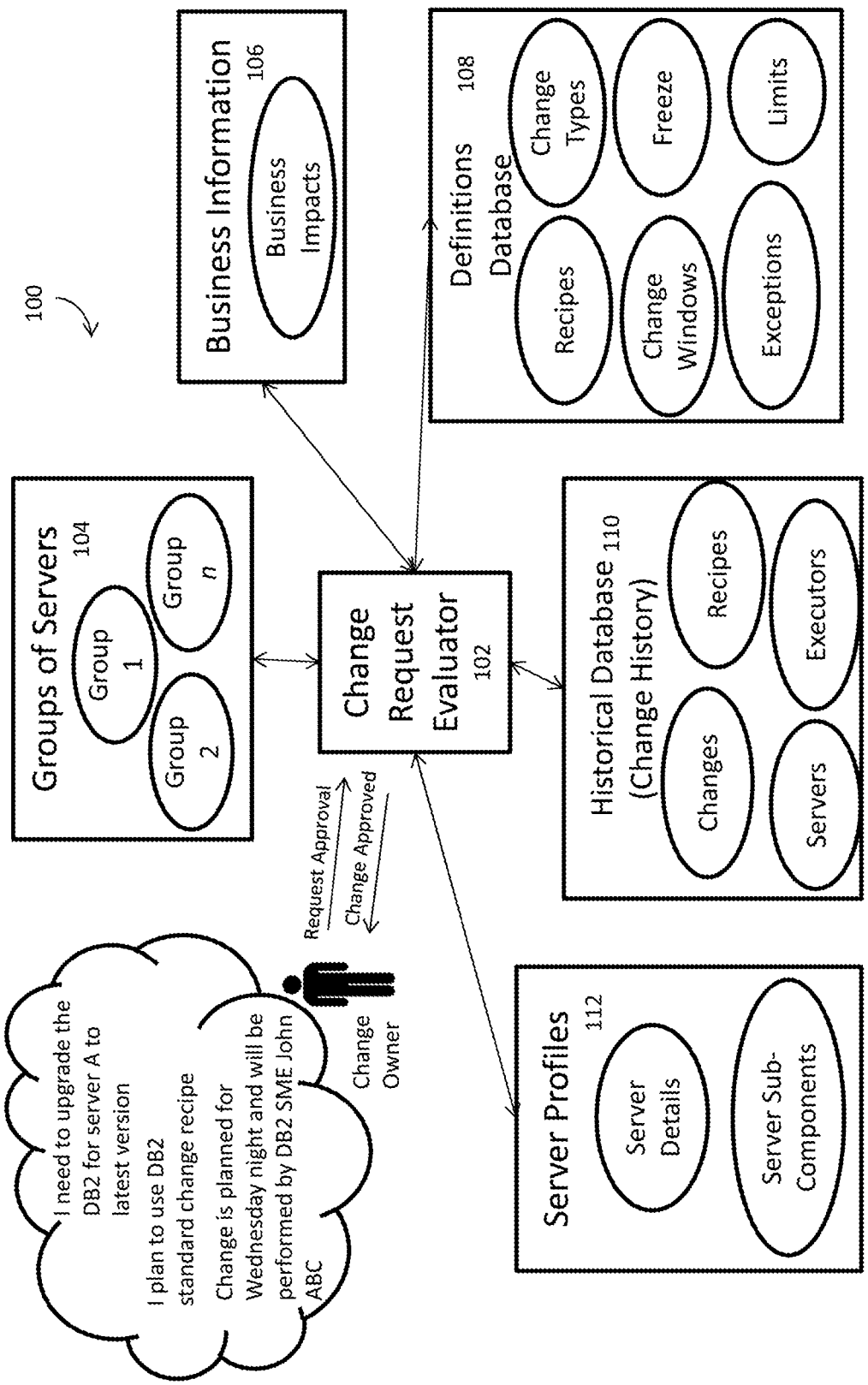
FIG. 2 is a diagram of a non-limiting illustrative embodiment for a cognitive change request system.

Referring again to the drawings, wherein like reference numerals refer to like parts throughout, there is seen in FIG. 2 a diagram of a non-limiting illustrative embodiment of a cognitive change request system 100. The system 100 comprises a cognitive change request evaluator 102, a computer system component which is based on a machine learning trained model and which receives information as data from one or more servers 104, a business information component 106, a definitions database 108, a historical database 110, and a server profile component 112. The servers 104 in the system may be categorized into groups, such as Group 1, Group 2, . . . , Group n, as shown. In one embodiment, the servers 104 are categorized into groups based on certain operational aspects, such as the function they serve. Such operational aspects are stored in the system 100 as server profile data at a server profile component 112. The server profile data includes information about each server, including details and sub-components. For example, such details may include the location of the server or the type of server (e.g., a database server, an application server, or a web server). Each type of server will have specific sub-components, like a particular type of management system, for example.

In one embodiment, the business information component 106 comprises data indicative of business impacts for types of change requests. The business impacts are based on change records of the actual business impacts of prior executed changes. As will be discussed below, the business impact of prior changes can be categorized by change request type and used to predict the business impact of a new change request through machine learning techniques.

As also shown in FIG. 2, the definitions database 108 stores input data, such as change types, change windows, change recipes, change freeze periods, exceptions, and limits. The input data in the definitions database 108 will allow the system 100 to interpret incoming change requests from a change owner. The definitions database 108 is utilized for natural language processing of an incoming change request. The historical database 110 comprises data related to prior change requests. For example, the historical database 110 may contain data regarding prior change types, servers, executors, and recipes. The historical database 110 is necessary for machine learning as new associations may be made based on information (data) from each new change request. The aforementioned components of the system 100 are utilized to evaluate and approve IT change requests based on natural language processing and machine learning technologies.

Figure 3:
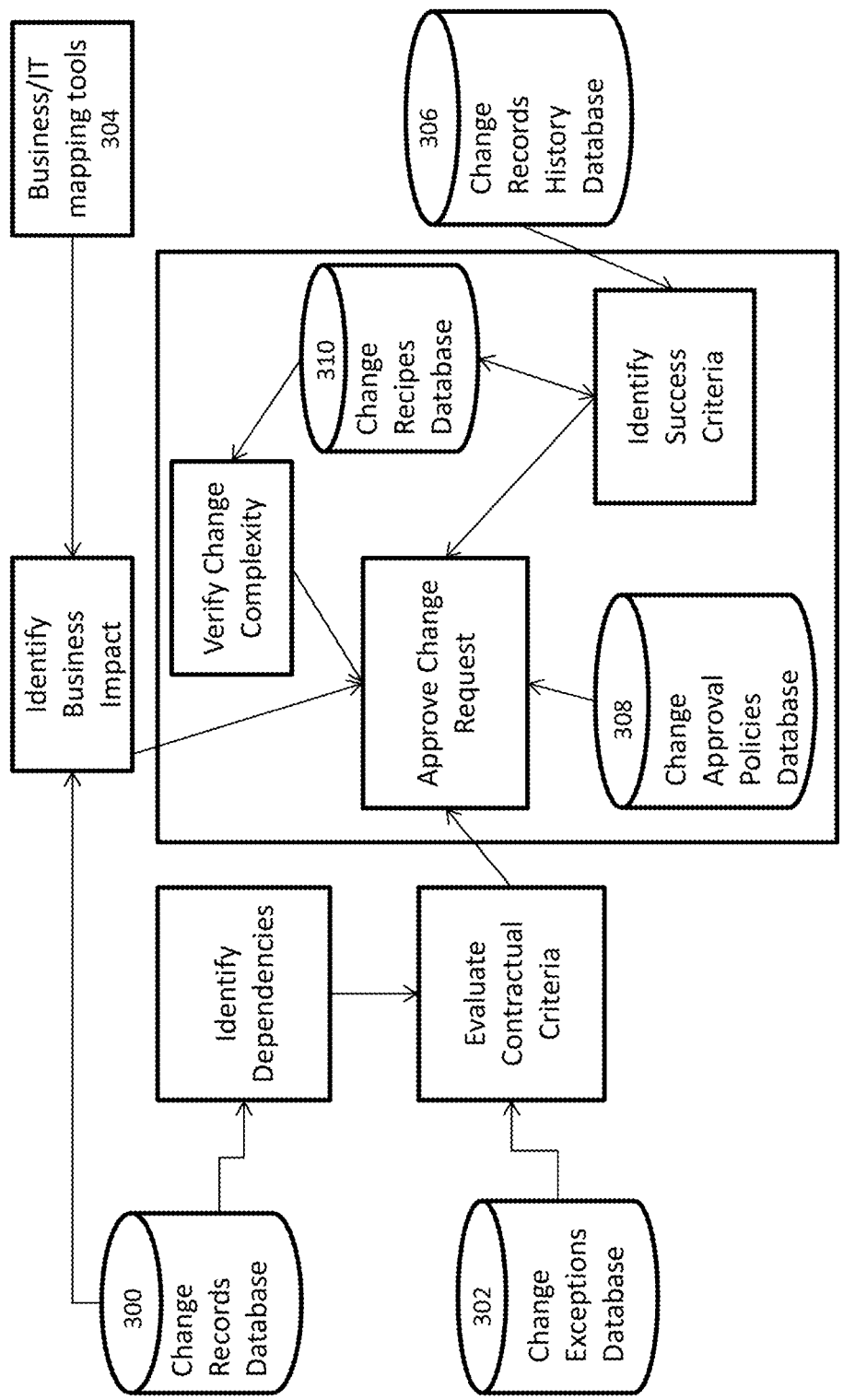
FIG. 3 is a diagram of a non-limiting illustrative embodiment for a method for evaluating and approving change requests.
Figure 4:
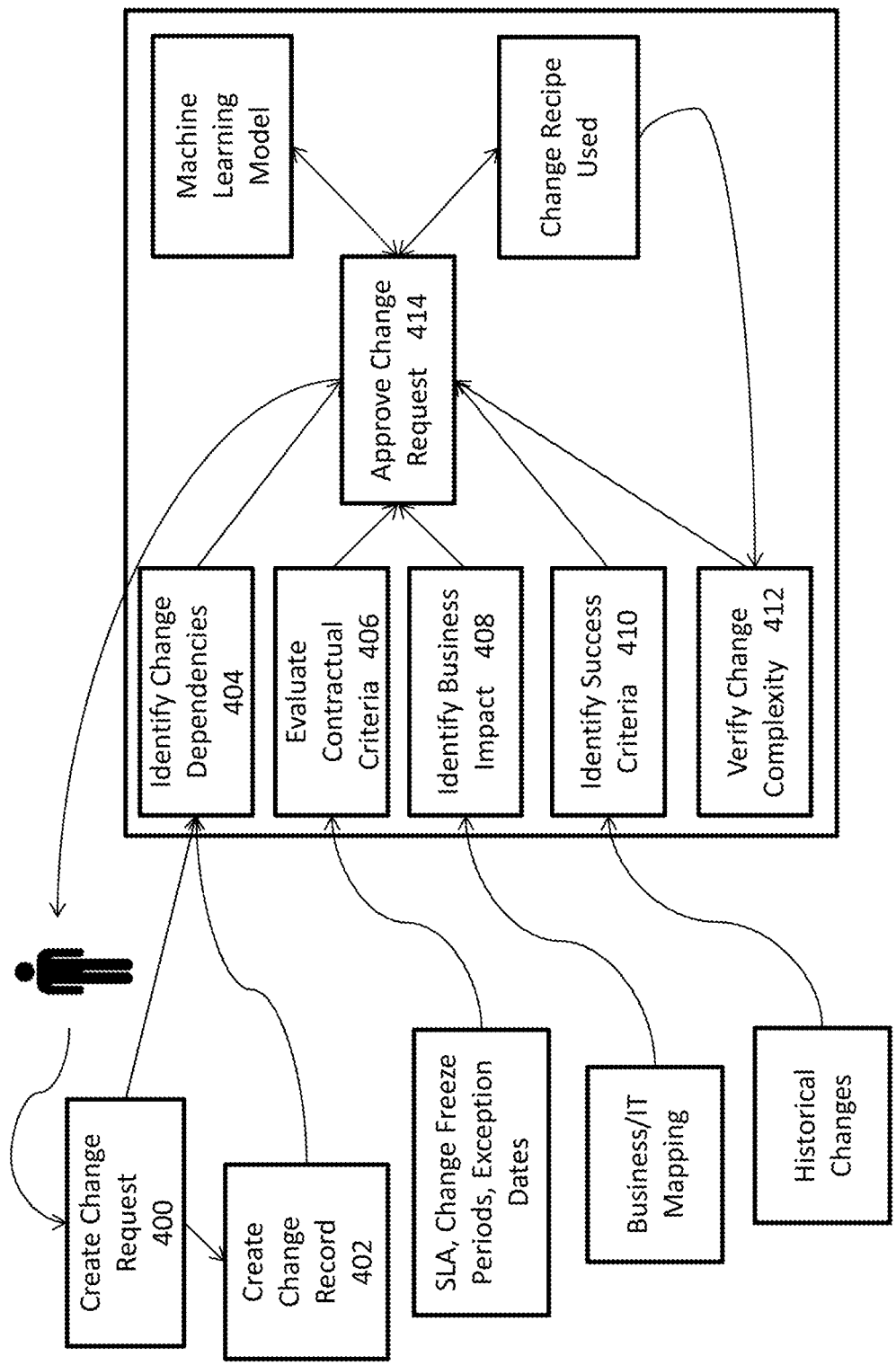
FIG. 4 is a flowchart of a non-limiting illustrative embodiment for a method for evaluating and approving change requests.

Referring now to FIGS. 3-4, there is shown a diagram and a flowchart of non-limiting illustrative embodiments of a method for evaluating and approving change requests. As shown in the depicted embodiment, the first step 400 in FIG. 4 of the method occurs when a change request is created by a user (i.e., change request owner) and the change request is received by the cognitive change request system 100. For example, a change request may be: "upgrade DB2 (i.e., database management system) for server A to the latest version." In one embodiment, the change request may comprise additional details, such as the change recipe (e.g., DB2 standard change recipe), the proposed date of execution (e.g., Wednesday night), or the person executing the change request (e.g., DB2 SME John ABC).

At the second step 402, the system 100 creates a change record, which is then recorded in the change records database 300 (in FIG. 3). A change record may include change data comprising information related to the user (change owner), the target system, the change period, activities, and proposed outage. For example, the change record may include the name of the change owner as well as information submitted by the change owner, such as: DB2 of server A, DB2 standard change recipe, and Wednesday night.

At the following step 404, the system 100 will determine if the change can be executed at the proposed date and time. The system 100 makes this determination based at least in part on data from the change records database 300 by identifying dependencies. The system 100 will read the change record for the change request and identify the server and service to be changed. Referring briefly back to FIG. 2, the system 100 comprises a server profile component 112 with server details and server sub-components. Based on the server (including server details and server sub-components) and service identified, the system 100 will determine the technical impact of the change request. Through searching the change records database 300, the system 100 can determine if there are other change records that will be impacted by the present change request. In one embodiment, the system 100 identifies such technical impact by detecting overlaps in server details and sub-components through natural language processing with definitions stored in the definitions database 108 (in FIG. 2). If there are no dependencies (i.e., overlapping technical impacts) between change records and the present change request, the system 100 will determine that the present change request can be executed at the proposed date and time.

At the next step 406, the system 100 will evaluate the contractual criteria of the change request. At this step 406, the system 100 determines if the change request is in opposition to a contractual SLA, change freeze periods, or exception dates and times provided by the customer and stored in a change exceptions database 302. The system 100 does this by evaluating the contractual criteria of the proposed change request and identifying any overlaps between the contractual criteria and the SLA, change freeze periods, or exception dates and times. In one embodiment, the system 100 identifies such overlap with definitions stored in the definitions database 108. By comparing the proposed date and time of the change request against the change freeze period, the SLA calculation can be leveraged so that the change can be executed without breaching any SLA. This step 406 optimizes change execution because the change will only be executed if the change complies with existing SLAs to avoid outages. In the embodiment shown in FIG. 3, the dependencies identified at the previous step 404 are considered, evaluated, and potentially leveraged with contractual criteria.

Still referring to FIG. 4, at the next step 408, the system 100 identifies a business impact resulting from the proposed change. To execute this step, the system 100 (via the business information component 106 in FIG. 2) interfaces with business service management tools 304 to identify the impact. In one embodiment, the business impact is determined at least in part on analysis of prior executed changes. In one embodiment, the determined business impact is compared to a disruption threshold. If the business impact extends beyond the disruption threshold, the change request will not be approved. This step 408 increases efficiency and optimizes the change process because most change owners do not know or cannot foresee the impact of the change on the overall client business. Similarly, interfacing with business service management tools 304 is more efficient than individual approvers evaluating the business impact of the proposed change as occurs in traditional change approval processes (shown in FIG. 1).

At the following step 410, the system 100 identifies success criteria. To determine success criteria, the system 100 analyzes prior change records to determine if the same type of change request was previously successful or not executed. The system 100 will also determine who (i.e., which SMEs) executed the previous similar type change requests. Thus, the system 100 looks at historical data of previous change records to identify "model" change records which resulted in approval of a change request. Criteria is identified and extracted from the model change records so that such criteria may be identified in future change requests and approval of future change requests may be expedited. Previous change requests are stored as change records in a change records history database 306 (i.e., historical database 110 in FIG. 2). This step 410 leverages machine learning technology to create change approval policies and change recipes. In one embodiment, the system 100 determines success criteria by comparing change requests of the same type in the historical database 306 (110 in FIG. 2). From the success criteria, the system 100 creates change approval policies stored in a change approval policy database 308 to be used to more quickly and efficiently evaluate new change requests of that same type.

In another embodiment, the system 100 similarly uses machine learning technology to identify success criteria regarding change recipes and creates change recipes with a greater likelihood of approval. The change recipes generated by the system 100 may be stored in a change recipes database 310, which can be accessed and used by change owners when creating a change request. In one embodiment, the machine learning model is created by SMEs within the domain and will leverage historical changes and recipes to train the model. A sample set comprising an initial relevant set of registers can be used to give the machine learning model a level of accuracy to be able to evaluate and create change policies stored in the change approval policies database 308 to be used by the change request approver 102 (in FIG. 2) component. As new relevant changes are created and processed that were never seen before, the model can be retrained by the SMEs and published.

At the next step 412, the system 100 verifies the complexity of the change. To do this, the system 100 looks at the type of change requested. The system 100 will determine if the change requested is a regular or ordinary change that occurs in the particular business, or if the change requested is more complex. In one embodiment, the system 100 may compare the change request to other change recipes in the change recipe database 310. By comparing the change recipes in the change recipe database 310 to the change request, the system 100 can determine if the change request is classified as medium or high complexity. In an embodiment wherein the change request cannot be related or otherwise compared to a change recipe from the change recipe database 310, the change request is evaluated using the preceding steps 400-410 through machine learning and is stored as a new change recipe in the change recipe database 310.

At the final step 414, the system 100 will compile all information identified and verified by the previous steps 400-412 and approve the change request, as appropriate. The information is compiled through machine learning policies and rules of the system 100 according to the previous steps 400-412. The information is leveraged from the components of the system 100 to evaluate the request based on the change approval policies in the change approval policies database 308 created by the machine learning model. Once the request is evaluated, the system 100 will either approve or reject the change request.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A computer system for evaluating an IT change request, comprising:
   one or more computer processors;
   one or more computer readable storage media;
   computer program instructions, the computer program instructions being stored on the one or more computer readable storage media for execution by the one or more computer processors, and the computer program instructions including instructions to:
   receive a change request associated with a computing device at a cognitive change request system based on a machine learning model having one or more learned change approval policies, wherein the change request includes at least a date, and a time period at which a change to the computing device will occur, and a change recipe;
   generate a change request record for the change request;
   determine whether the change recipe included in the change request can be performed at the date and time period specified in the change request based, at least in part, on instructions to:
      determine whether the change request has any technical impact on any change records already created for the computing device, based on natural language processing of the change request and any change records already created for the computing device;
      responsive to determining the change request does not have any technical impact on any change records already created for the computing device, determine whether a same type of change request as the generated change request was previously successfully executed, based on comparing one or more previous change records from historical data;
      generating a new change recipe for the change request based, at least in part on a determination that the same type of change request was not successfully executed;
   approve the change request with the new change recipe; and
   retraining the one or more learned change approval policies for the machine learning model of the cognitive change request system with the change request record including the new change recipe within a change records database.

2. The computer system of claim 1, further comprising instructions to:

execute the approved change request associated with the computing device during the time period and on the date specified in the change request.

3. The computer system of claim 1, wherein the change request presents a technical impact on a change record already created for the computing device based, at least in part, on identifying a sub-component of the computing device included in both the change request and the change record already created for the computing device.

4. The computer system of claim 1, wherein the program instructions to approve the change request is further based on instructions to:
  determine that the time period and the date at which the change to the computing device will occur do not conflict with a predetermined change freeze period associated with the computing device.

5. The computer system of claim 1, wherein the program instructions to approve the change request is further based on instructions to:
  determine that the time period and the date at which the change to the computing device will occur do not conflict with a service level agreement (SLA) associated with the computing device.

6. The computer system of claim 1, wherein the program instructions to approve the change request is further based on instructions to:
  identify a business impact associated with the change request; and
  determine that the business impact associated with the change request is below a predetermined threshold.

7. A computer program product for evaluating an IT change request, the computer program product comprising one or more computer readable storage media and program instructions stored on the one or more computer readable storage media, the program instructions including instructions to:
  receive a change request associated with a computing device at a cognitive change request system, based on a machine learning model having one or more learned change approval policies, wherein the change request includes at least a date, and a time period at which a change to the computing device will occur, and a change recipe;
  generate a change request record for the change request;
  determine whether the change recipe included in the change request can be performed at the date and time period specified in the change request based, at least in part, on instructions to:
    determine whether the change request has any technical impact on any change records already created for the computing device, based on natural language processing of the change request and any change records already created for the computing device;
    responsive to determining the change request does not have any technical impact on any change records already created for the computing device, determine whether a same type of change request as the generated change request was previously successfully executed, based comparing on one or more previous change records from historical data;
    generating a new change recipe for the change request based, at least in part on a determination that the same type of change request was not successfully executed;
  approve the change request with the new change recipe; and retraining the one or more learned change approval policies for the machine learning model of the cognitive change request system with the change request record including the new change recipe within a change records database.

8. The computer program product of claim 7, further comprising instructions to:
  execute the approved change request associated with the computing device during the time period and on the date specified in the change request.

9. The computer program product of claim 7, wherein the change request presents a technical impact on a change record already created for the computing device based, at least in part, on identifying a sub-component of the computing device included in both the change request and the change record already created for the computing device.

10. The computer program product of claim 7, wherein the program instructions to approve the change request is further based on instructions to:
  determine that the time period and the date at which the change to the computing device will occur do not conflict with a predetermined change freeze period associated with the computing device.

11. The computer program product of claim 7, wherein the program instructions to approve the change request is further based on instructions to:
  determine that the time period and the date at which the change to the computing device will occur do not conflict with a service level agreement (SLA) associated with the computing device.

12. The computer program product of claim 7, wherein the program instructions to approve the change request is further based on instructions to:
  identify a business impact associated with the change request; and
  determine that the business impact associated with the change request is below a predetermined threshold.

13. A computer-implemented method for evaluating an IT change request, comprising:
  receiving a change request associated with a computing device at a cognitive change request system, based on a machine learning model having one or more learned change approval policies, wherein the change request includes at least a date, and a time period at which a change to the computing device will occur, and a change recipe;
  generating a change request record for the change request;
  determining whether the change recipe included in the change request can be performed at the date and time period specified in the change request based, at least in part, on instructions to:
    determining whether the change request has any technical impact on any change records already created for the computing device, based on natural language processing of the change request and any change records already created for the computing device;
    determining the change request does not have any technical impact on any change records already created for the computing device, determine whether a same type of change request as the generated change request was previously successfully executed, based comparing on one or more previous change records from historical data;
    generating a new change recipe for the change request based, on a determination that the same type of change request was not successfully executed; and retraining the one or more learned change approval policies for the machine learning model of the cognitive change request system with the change request record including the new change recipe within a change records database.

14. The computer-implemented method of claim 13, further comprising:
executing the approved change request associated with the computing device during the time period and on the date specified in the change request.

15. The computer-implemented method of claim 13, wherein the change request presents a technical impact on a change record already created for the computing device based, at least in part, on identifying a sub-component of the computing device included in both the change request and the change record already created for the computing device.

16. The computer-implemented method of claim 13, wherein approving the change request is further based on:
determine that the time period and the date at which the change to the computing device will occur do not conflict with a predetermined change freeze period associated with the computing device.

17. The computer-implemented method of claim 13, wherein approving the change request is further based on:
determining that the time period and the date at which the change to the computing device will occur do not conflict with a service level agreement (SLA) associated with the computing device.

18. The computer-implemented method of claim 13, wherein approving the change request is further based on:
identifying a business impact associated with the change request; and
determining that the business impact associated with the change request is below a predetermined threshold.

* * * * *